(Model.)

H. A. HARVEY.
RESILIENT SPIRAL WASHER.

No. 440,631. Patented Nov. 18, 1890.

UNITED STATES PATENT OFFICE.

HAYWARD A. HARVEY, OF ORANGE, NEW JERSEY.

RESILIENT SPIRAL WASHER.

SPECIFICATION forming part of Letters Patent No. 440,631, dated November 18, 1890.

Application filed February 15, 1890. Serial No. 340,606. (Model.)

*To all whom it may concern:*

Be it known that I, HAYWARD A. HARVEY, of Orange, New Jersey, have invented certain Improvements in Resilient Spiral Washers, of which the following is a specification.

This invention consists of a resilient metallic washer having the form of a strip cut spirally from a hollow cylinder and composed of a fraction over one convolution of a spiral and having its ends chamfered in a plane which is diagonal with relation to the geometrical axis of the spiral, whereby when the washer is applied to a bolt and compressed between the nut and the face of the object through which the bolt is inserted the concave edge of the washer adjoining the end in contact with the nut and the corresponding edge on the opposite side of the washer are canted outwardly from each other, and thus present sharp corners tending to embed themselves in the faces of the objects with which they are respectively in contact. As the nut is screwed home the collision of the chamfered ends of the washer with each other so greatly increases the resistance of the spiral washer to compression that the concave edge of the washer in contact with the nut is made to plow an annular groove in the face of the nut and to drive a portion of the consequently-displaced metal convergently toward and against the bolt, and to thereby produce the locking effect heretofore produced by the action of a resilient spiral washer provided with a projecting rib upon the inner edge of the side of the washer intended for contact with the nut.

By my present invention the necessity of using the rib is avoided and a spiral washer amply capable of driving a portion of the metal of the nut convergently against the bolt can be manufactured from a steel rod or bar which is quadrangular in cross-section.

Figure 1:
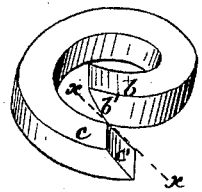
Figure 2:
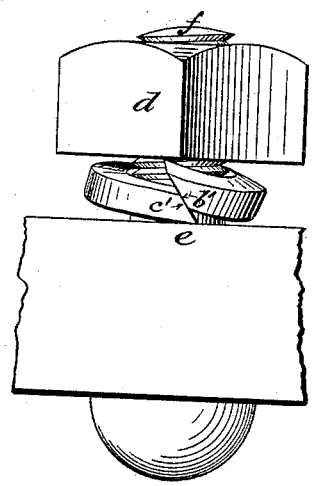
Figure 3:
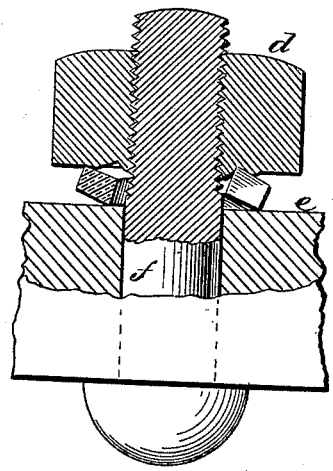

The accompanying drawings, illustrating washers embodying the present improvement, are as follows:

Figure 1 is an isometrical perspective showing the shape in which the washer is manufactured from a square rod or bar preparatory to use. Fig. 2 is a view of the washer applied to a bolt and interposed between the nut and the object through which the bolt is inserted, showing the effects of compression in bringing about a collision of the chamfered ends of the washer with each other and imparting a wind to the bar of which the washer is made. Fig. 3 is an axial section showing the nut screwed home and illustrating the resulting effects of flattening the washer and of displacing and driving a portion of the metal of the nut inward against the bolt.

Washers of the type shown in the drawings may be conveniently made by first forming a metallic bar which is quadrangular in cross-section into a spiral and then severing the washers successively from the spiral. It will be seen that the washer represented in the drawings is composed of one complete convolution of the spiral and a fractional part of another convolution.

In severing the washers from the spiral each cut is made in a plane (indicated by the dotted line $x\ x$ in Fig. 1) which diagonally intersects the bar or rod from which the spiral is made. By this mode of cutting the washer is provided with the two chamfered ends $b\ c$, which, as will be seen, overlap each other. The washers are hardened and brought to a spring-temper in the usual manner. The first effect produced by the compression of the washer between the nut $d$ and the face of the object $e$, through which the bolt $f$ is inserted, is to bring the obtuse angles $b'$ and $c'$ of the chamfered ends $b$ and $c$ into collision with each other, as shown in Fig. 2. Thereafter as the nut is screwed home the chamfered ends $b$ and $c$ ride upon each other and greatly increase the resistance of the washer to compression in the direction of its geometrical axis. As such compression continues the rod of which the spiral is composed acquires a wind in the direction of its length, which causes the concave edges on its outer sides adjoining its ends to cant outwardly from each other and present sharp corners respectively toward the nut and toward the object through which the bolt is inserted.

The effect of transforming a square bar into the spiral form shown is to condense the metal upon the inside of the spiral and to draw it out upon the outside, so that upon its concave or inner side the spiral bar is wider than upon its convex or outer side. It hence results that while the nut is being screwed home, the sharp inner corner of the washer adjoining the end of the washer in contact with the nut plows an annular groove in the face of the nut and displaces and drives a portion of the metal thereof convergently against the bolt, thus greatly increasing the grip of the nut upon the bolt, and thereby so locking the nut in place after it is screwed home that no ordinary jar will be capable of causing it to become loosened or unscrewed.

What is claimed as the invention is—

A resilient spiral metallic washer made from a quadrangular bar of metal and composed of one convolution of a spiral and a fractional part of another convolution, and having each of its ends chamfered upon a plane which diagonally intersects the rod or bar from which the spiral is formed, and provided with projecting cutting-corners along the inner concave side of the spiral.

H. A. HARVEY.

Witnesses:
A. M. JONES,
WM. E. QUIMBY.